(12) United States Patent
Agarwal et al.

(10) Patent No.: US 11,500,104 B2
(45) Date of Patent: Nov. 15, 2022

(54) LOCALIZING A MOVING OBJECT

(71) Applicant: Ford Global Technologies, LLC, Dearborn, MI (US)

(72) Inventors: Siddharth Agarwal, Dearborn, MI (US); Faizan Shaik, Ann Arbor, MI (US); Ankit Girish Vora, Dearborn, MI (US); Sangjin Lee, Pittsburgh, PA (US); Mostafa Parchami, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 609 days.

(21) Appl. No.: 16/542,726

(22) Filed: Aug. 16, 2019

(65) Prior Publication Data
US 2021/0048533 A1 Feb. 18, 2021

(51) Int. Cl.
G01S 17/931 (2020.01)
G01S 5/00 (2006.01)
G06T 17/00 (2006.01)
G05D 1/02 (2020.01)
G06T 7/73 (2017.01)

(52) U.S. Cl.
CPC .......... G01S 17/931 (2020.01); G01S 5/0072 (2013.01); G05D 1/0236 (2013.01); G05D 1/0274 (2013.01); G06T 7/75 (2017.01); G06T 17/00 (2013.01); G06T 2207/30261 (2013.01)

(58) Field of Classification Search
CPC .... G01S 17/931; G01S 5/0072; G01S 7/4802; G01S 7/4808; G01S 17/89; G01S 17/42; G01S 17/87; G05D 1/0236; G05D 1/0274; G06T 7/75; G06T 17/00; G06T 2207/30261; G06T 2207/10021; G06T 2207/20072; G06T 2207/30252
See application file for complete search history.

(56) References Cited

U.S. PATENT DOCUMENTS

| | | | |
|---|---|---|---|
| 9,727,793 B2 | 8/2017 | Heisele et al. | |
| 9,971,352 B1* | 5/2018 | Mudalige | B60W 50/023 |
| 10,094,906 B2 | 10/2018 | Vijaya Kumar et al. | |
| 2014/0176679 A1 | 6/2014 | Lehning | |
| 2016/0363647 A1 | 12/2016 | Zeng et al. | |
| 2018/0341273 A1 | 11/2018 | Micks et al. | |
| 2019/0197196 A1* | 6/2019 | Yang | G02B 27/017 |
| 2020/0250879 A1* | 8/2020 | Foster | G05D 1/0276 |

* cited by examiner

Primary Examiner — Marthe Y Marc-Coleman
(74) Attorney, Agent, or Firm — Frank A. MacKenzie; Bejin Bieneman PLC

(57) ABSTRACT

A reference pose of an object in a coordinate system of a map of an area is determined. The reference pose is based on a three-dimensional (3D) reference model representing the object. A first pose of the object is determined as the object moves with respect to the coordinate system. The first pose is determined based on the reference pose and sensor data collected by the sensor at a first time. A second pose of the object is determined as the object continues to move with respect to the coordinate system. The second pose is determined based on the reference pose, the first pose, and sensor data collected by the sensor at a second time consecutive to the first time.

20 Claims, 6 Drawing Sheets

LOCALIZING A MOVING OBJECT

BACKGROUND

Vehicles can be equipped with on-board sensors such as Lidar (Light Detection and Ranging) sensors, radar sensors, camera sensors, etc., for providing data to map locations of objects in three dimensions. Vehicles can thus localize themselves using the on-board sensors. However, on-board sensors may be unavailable and/or have limited fields of view. Further, vehicle sensors may provide data from which it is not possible or is difficult to localize the vehicle with enough precision to provide reliable data.

SUMMARY

Figure 1:
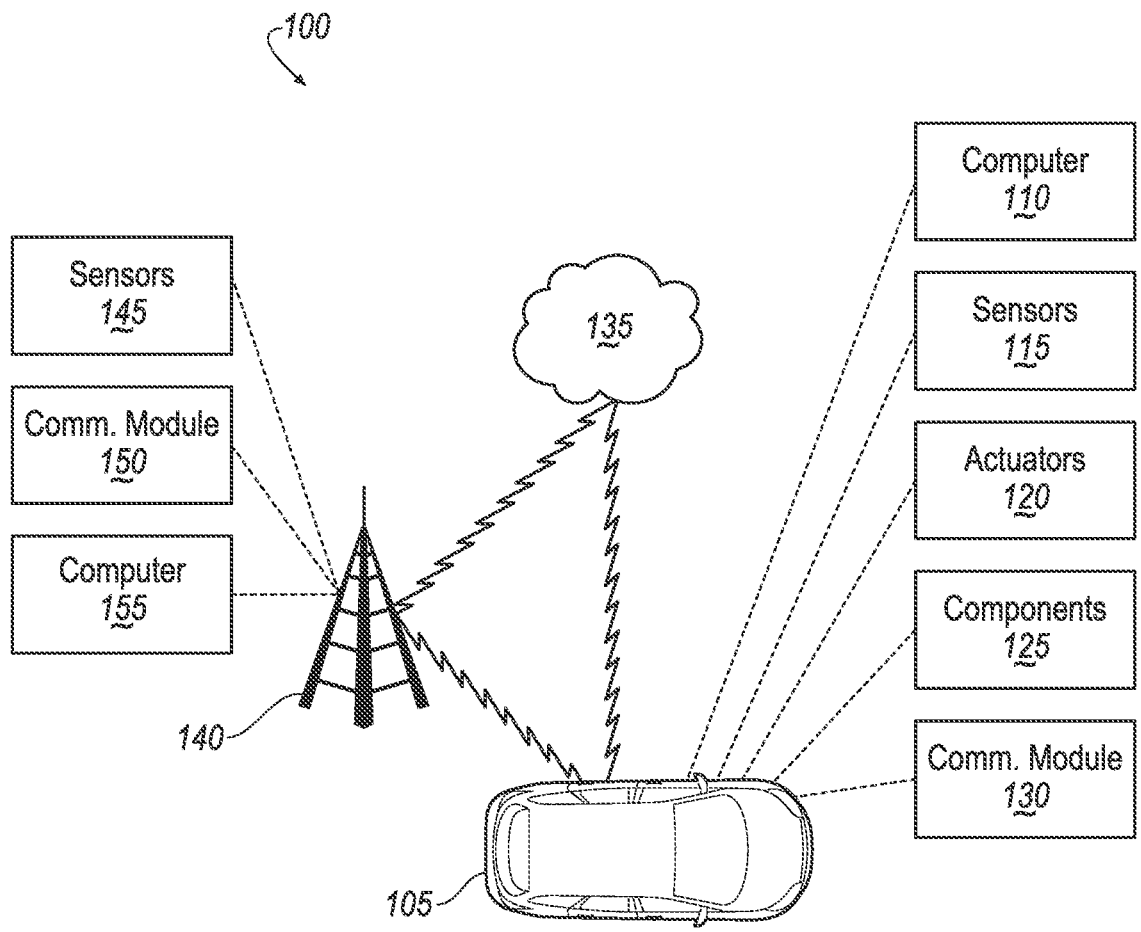
FIG. 1 is a block diagram illustrating an example system for operating a vehicle with localization input from an infrastructure element.

A computer comprises a processor and a memory. The memory stores instructions executable by the processor to determine a reference pose of an object in a coordinate system of a map of an area based on a three-dimensional (3D) reference model representing the object, determine a first pose of the object as the object moves with respect to the coordinate system, and determine a second pose of the object as the object continues to move with respect to the coordinate system. The first pose is determined based on the reference pose and sensor data collected by a sensor at a first time. The second pose is determined based on the reference pose, the first pose, and sensor data collected by the sensor at a second time that is consecutive to the first time. The object can be a vehicle, and the 3D reference model is determined based on identifying the vehicle. The memory further stores instructions to align the reference pose with the sensor data collected by the sensor at the first time to determine the first pose. The instructions to align the reference pose with the sensor data include instructions to execute a first closest point algorithm and further instructions to further align the sensor data collected by the sensor at the first time with the sensor data collected by the sensor at the second time to determine the second pose. The instructions to further align the sensor data collected by the sensor at the first time with the sensor data collected by the sensor at the second time include instructions to execute a second closest point algorithm. The memory stores further instructions to align sensor data subsequently collected by the sensor at each individual time with the sensor data further aligned at an immediately preceding time to determine an additional pose of the object as the object continues to move with respect to the coordinate system. The additional pose is determined based on the reference pose, the first pose, the second pose, and the sensor data subsequently collected by the sensor. The further instructions to align the sensor data subsequently collected by the sensor with the sensor data further aligned at the immediately preceding time include instructions to execute an additional closest point algorithm. The memory further stores instructions to transmit a pose graph aligned with respect to the coordinate system to a vehicle.

Further, a system comprises a stationary infrastructure element, a sensor mounted to the stationary infrastructure element, and a computer comprising a processor and a memory is provided. The memory stores instructions executable by the processor to determine a reference pose of an object in a coordinate system of a map of an area based on a three-dimensional (3D) reference model representing the object, determine a first pose of the object as the object moves with respect to the coordinate system, and determine a second pose of the object as the object continues to move with respect to the coordinate system. The first pose is determined based on the reference pose and sensor data collected by the sensor at a first time. The second pose is determined based on the reference pose, the first pose, and sensor data collected by the sensor at a second time consecutive to the first time. The object can be a vehicle, and the 3D reference model is determined based on identifying the vehicle. The memory stores further instructions to align the reference pose with the sensor data collected by the sensor at the first time to determine the first pose, further align the sensor data collected by the sensor at the first time with the sensor data collected by the sensor at the second time to determine the second pose, and align sensor data subsequently collected by the sensor at each individual time with the sensor data further aligned at an immediately preceding time to determine an additional pose. The further instructions to align may include instructions to execute a first closest point algorithm. The further instructions to further align may include instructions to execute a second closest point algorithm. The additional pose is based on the reference pose, the first pose, the second pose, and the sensor data subsequently collected by the sensor. The further instructions to align sensor data subsequently collected by the sensor may include instructions to execute an additional closest point algorithm.

A method comprises determining a reference pose of an object in a coordinate system of a map of an area based on a three-dimensional (3D) reference model representing the object, determining a first pose of the object as the object moves with respect to the coordinate system, and determining a second pose of the object as the object continues to move with respect to the coordinate system. The first pose is determined based on the reference pose and sensor data collected at a first time. The second pose is determined based on the reference pose, the first pose, and sensor data collected at a second time that is consecutive to the first time. The object can be a vehicle, and the 3D reference model is determined based on identifying the vehicle. The reference pose represents data of the 3D model. The first pose of the object is determined by aligning the reference pose with the sensor data collected at the first time. The second pose of the object is determined by further aligning the sensor data collected at the first time with the sensor data collected at the second time. Aligning the reference pose with the sensor data collected at the first time may include executing a first closest point algorithm. Further aligning the sensor data collected at the first time with the sensor data collected at the second time may include executing a second closest point algorithm. The method can further comprise determining an additional pose of the object as the object continues to move with respect to the coordinate system. The additional pose is determined based on the reference pose, the first pose, the second pose, and sensor data subsequently collected by the sensor. The additional pose is determined by aligning the sensor data subsequently collected by the sensor at each individual time with the sensor data further aligned at an immediately preceding time to determine the additional pose. Aligning the sensor data subsequently collected by the sensor at each individual time with the sensor data further aligned at the immediately preceding time may include executing an additional closest point algorithm. The method further comprises transmitting a pose graph aligned with respect to the coordinate system to a vehicle.

DETAILED DESCRIPTION

As explained above, it may be impossible and/or impractical to determine the pose (position and orientation) of a vehicle with enough accuracy, to the level required for autonomous driving. Various examples herein are directed to systems and processes for localizing a moving object with typically centimeter-level accuracy (e.g., within about 2-3 centimeters) as the object moves. To localize the object in the present context means to determine the pose of an object within an area with respect to the coordinate system. Motion of the object can then be tracked by localizing the object at successive points of time. As used herein, the "pose" of an object within an area is a location (a three-dimensional set of coordinates (x, y, z)), and an orientation (roll, pitch, yaw), of the object in three-dimensional (3D) space as described with respect to a three-dimensional coordinate system. As used herein, an "object" is a physical, i.e., material item and refers to a vehicle as well as other moving items. With respect to a vehicle, "localization" is a determined position and orientation of the vehicle with respect to the driving environment, including freely drivable areas and surrounding obstacles. A "coordinate system" for a map of an area can be a portion of a global coordinate system and/or a coordinate system having a specified origin, e.g., at an infrastructure element.

Vehicles in a traffic area may rely on pose data (sensor data or data derived therefrom) for operations and decision-making, such as navigating in an area, braking and/or decelerating, accelerating, lane changing, steering, etc. While one or more sensors (e.g., lidar sensors) mounted to stationary infrastructure elements within the area may be used to map locations of objects in three dimensions, these sensors and on-board vehicle sensors may be affected by the environment (e.g., in an urban canyon) and can fail to localize an object, e.g., when the object is only partially visible to the sensor. It can also be difficult to localize an object with enough precision to provide reliable data. Additionally, some objects that need to be localized do not include on-board sensors. While autonomous vehicles can localize themselves, autonomous vehicles themselves still need to detect and localize other objects including other autonomous vehicles, human-driven vehicles, etc.

Figure 2:
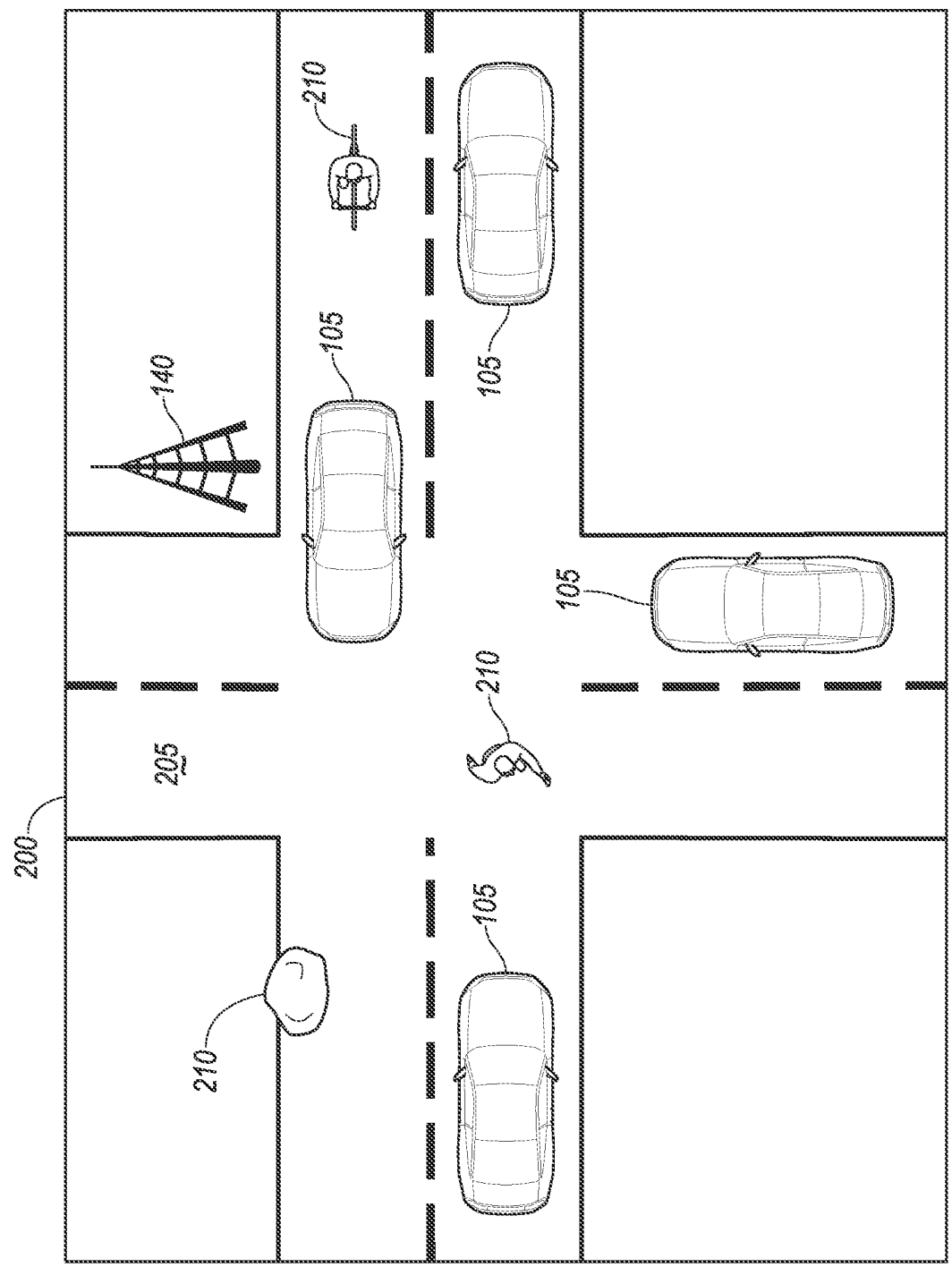
FIG. 2 is a diagram illustrating an example traffic scene in which the system of FIG. 1 could be implemented.

Referring now to FIG. 1, a block diagram of an example system for localizing a moving object, and for operating a vehicle 105 based at least in part on the localization, is illustrated. While localizing a vehicle is described, it is to be understood that other moving objects may likewise be localized. One or more vehicles 105 can provide data to each other and/or to one or more stationary infrastructure elements 140. One each of a vehicle 105 and stationary infrastructure element 140 are shown in FIG. 1 for ease of illustration. FIG. 2 illustrates a traffic scene or area 200 in which an example stationary infrastructure element 140 and a plurality of vehicles 105 may exchange data with one another, e.g., data about roads 205, objects 210, and other objects/features of a local environment.

Still referring to FIG. 1, the vehicle 105 typically (but not necessarily) is a land vehicle such as a car, truck, etc. Additionally, or alternatively, a vehicle 105 may include a bicycle, a motorcycle, etc. A vehicle 105 includes a vehicle computer 110, sensors 115, actuators 120 to actuate various vehicle components 125, and a vehicle communications module 130. The communications module 130 allows the vehicle computer 110 to communicate with one or more stationary infrastructure elements 140 and a central server (not shown for ease of illustration), e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The computer 110 may operate the vehicle 105 in an autonomous, a semi-autonomous mode, or a non-autonomous (or manual) mode. For purposes of this disclosure, an autonomous mode is defined as one in which each of vehicle propulsion, braking, and steering are controlled by the vehicle computer 110; in a semi-autonomous mode the computer 110 controls one or two of vehicles propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle network such as a communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle network, the computer 110 may transmit messages to various devices in the vehicle 105 and/or receive messages (e.g., CAN messages) from the various devices, e.g., sensors 115, actuator 120, a human machine interface (HMI), etc. Alternatively, or additionally, in cases where the computer 110 actually comprises a plurality of devices, the vehicle communication network may be used for communications between devices represented as the computer 110 in this disclosure. Further, as mentioned below, various controllers and/or sensors 115 may provide data to the computer 110 via the vehicle communication network.

Vehicle sensors 115 may include a variety of devices such as are known to provide data to the computer 110. For example, vehicle sensors 115 may include Light Detection and Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle bumpers may provide data to provide locations of the objects, second vehicles, etc., relative to the location of the vehicle 105. The vehicle sensors 115 may further alternatively or additionally, for example, include camera sensor(s), e.g. front view, side view, etc., providing images from an area surrounding the vehicle 105. As stated above, an object is a physical, i.e., material, item, i.e., that can be represented by physical phenomena (e.g., light or other electromagnetic waves, or sound, etc.) detectable by sensors 115. Thus, vehicles 105, as well as other moving items including as discussed below, fall within the definition of "object" herein, as noted previously.

The vehicle actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of vehicle components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications (cellular and/or DSRC., etc.) to another vehicle—to an infrastructure element 140 (typically via direct radio frequency communications) and/or (typically via the network 135) a remote server (not shown). The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 can include cellular, Bluetooth, IEEE 802.11, dedicated short range communications (DSRC), cellular V2X (CV2X), and the like.

The network 135 represents one or more mechanisms by which a vehicle computer 110 may communicate with the infrastructure element 140 and/or central server (not shown). Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, Dedicated Short Range Communications (DSRC), Cellular Vehicle-to-Everything Communication (CV2x) etc.), local area networks (LAN) and/or wide area networks (WAN), including the Internet, providing data communication services.

The stationary infrastructure element 140 includes a physical structure such as a tower or other support structure (e.g., a pole, a box mountable to a bridge support, cell phone tower, road sign support, etc.) on or in which infrastructure sensors 145, such as a LIDAR sensor, as well as an infrastructure communications module 150 and computer 155 can be housed, mounted, stored, and/or contained, and powered, etc. One stationary infrastructure element 140 is shown for ease of illustration in FIG. 1 for ease of illustration, but the system 100 could and likely would include tens, hundreds, or thousands of stationary infrastructure elements 140.

An infrastructure element 140 is typically stationary, i.e., fixed to and not able to move from a specific physical location. In this example, the location of the infrastructure element 140 is specified by GPS coordinates (i.e., conventional latitude and longitude geo-coordinates), which, as noted previously, can have an error, i.e., lack precision, of up to several, e.g., 2 to 3, meters. The infrastructure sensors 145 may be such as described above for the vehicle sensors 115, e.g., LIDAR, radar, cameras, ultrasonic sensors, etc. The infrastructure sensors 145 are fixed or stationary. That is, each sensor 145 is mounted to the infrastructure element to have a substantially unmoving and unchanging field of view. For convenience, "infrastructure" may be abbreviated to "IX," e.g., in labels in the figures. Thus, the infrastructure element 140 can be provided in an area 200 (FIG. 2) to provide data about the area 200, including data about objects such as vehicles, pedestrians, bicycles, etc., as well as other moving and/or stationary objects. The area 200 can be defined as an area within a field of view of an infrastructure sensor or, alternatively, as a specified distance, e.g., a radius, a rectangle, etc., around the infrastructure sensor 145, or simply as a specified area that includes the infrastructure sensor 145.

Sensors 145 thus provide field of views differing from vehicle sensors 115 in several respects. First, as sensors 145 have a substantially constant field of view, determinations of vehicle 105 and object locations can be accomplished with fewer and simpler processing resources than if movement of the sensors 145 also had to be accounted for. Further, the sensors 145 include an external perspective of the vehicle 105, i.e., a field of view originating a distance from, and that can include, the vehicle 105, and can sometimes detect features and characteristics of objects not in the vehicle sensors 115 field(s) of view and/or can provide more accurate detection, e.g., with respect to vehicle location and/or movement with respect to other objects. Yet further, sensors 145 can communicate with the infrastructure element computer 155 via a wired connection, whereas vehicles 105 typically can communicate with infrastructure elements 140 and/or a server 170 only wirelessly, or only at very limited times when a wired connection is available. Wired communications are typically more reliable and can be faster than wireless communications such as vehicle-to-infrastructure (V2X or V-to-X) communications or the like.

The communications module 150 and computer 155 typically have features in common with the vehicle computer 110 and vehicle communications module 130, and therefore will not be described further to avoid redundancy. Although not shown for ease of illustration, the stationary infrastructure element 140 also includes a power source such as a battery, solar power cells, and/or a connection to a power grid.

Referring again to FIG. 2, the infrastructure element 140 can be provided to monitor a defined area 200 around the infrastructure element 140. For example, the defined area 200 could be an area that is proximate to the infrastructure element 140. In the present context, "proximate" means that the area 200 is defined by a field of view of one or more infrastructure sensors 145. The defined area 200 could alternatively be an area defined by a radius around the element 140 or some other distance or set of distances relative to the infrastructure element 140.

In addition to vehicles 105, an area 200 can include other objects 210, e.g., a pedestrian object 210, a boulder object 210, a bicycle object 210, etc., i.e., an area 200 could alternatively or additionally include many other objects 210, e.g., bumps, potholes, curbs, berms, fallen trees, litter, construction barriers or cones, etc. Objects 210 can be specified as being located according to a coordinate system for a map of an area 200 maintained by the vehicle computer 110 and/or infrastructure computer 155 (see FIG. 1), e.g., according to a Cartesian coordinate system or the like specifying coordinates in the area 200. For example, as stated above, the location of the fixed infrastructure element can be identified by coordinates in the area 200 (e.g., GPS coordinates (i.e., conventional latitude and longitude geo-coordinates)). Additionally, data about an object 210 could specify characteristics of a hazard or object in a sub-area such as on or near a road 205, e.g., a height, a width, etc.

Figure 3:
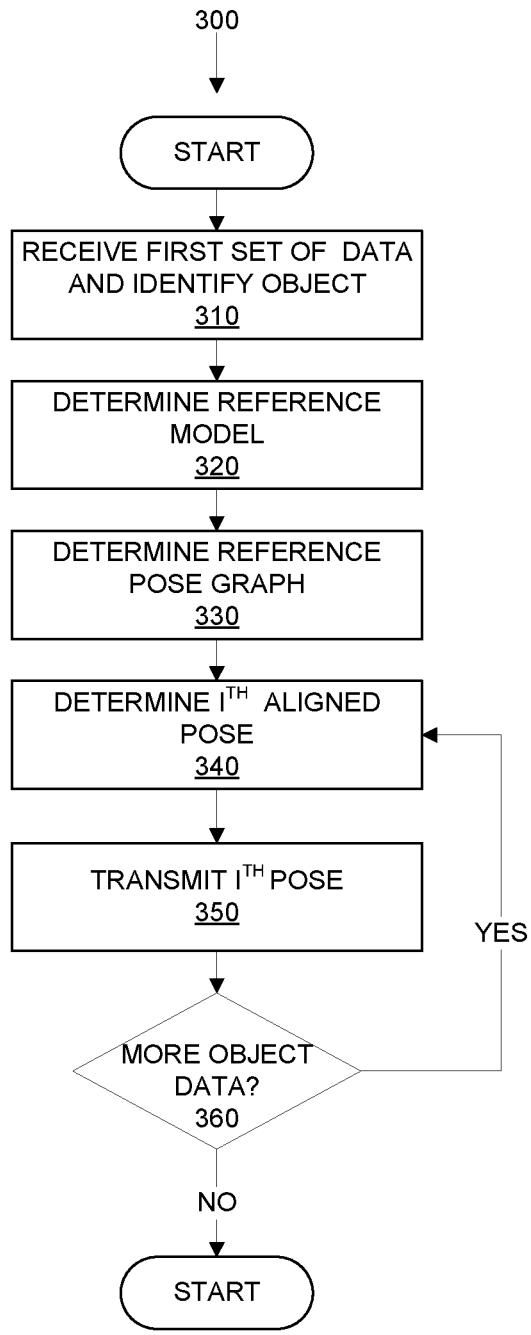
FIG. 3 illustrates an exemplary process for operating a vehicle including localizing a moving object.

Referring now to FIG. 3, an exemplary process 300 for localizing an object in an area 200 (typically but not necessarily a moving object) provides an accurate real-time or substantially real-time pose for the object, e.g., that can be provided as input to a computer 110 for operating a vehicle 105. The process 300 is described herein as carried out by (i.e., program instructions for the process 300 could be stored in a memory and executable by a processor of) a computer 155 mounted to an infrastructure element 140, but could be carried out according to program instructions executed by a processor of the vehicle computer 110, the infrastructure computer 155, and/or some other general-purpose computer, e.g., a remote server or other computer at a remote location to which point cloud data could be uploaded and processed as described herein.

Figure 4:
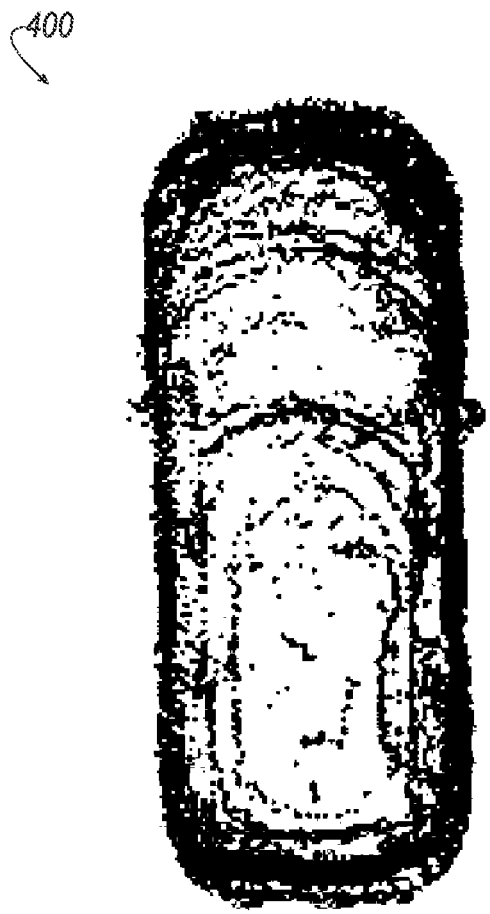
FIG. 4 illustrates an exemplary point cloud including a pose graph that specifies a reference pose of an exemplary moving object (a vehicle) with respect to a coordinate system.
Figure 5:
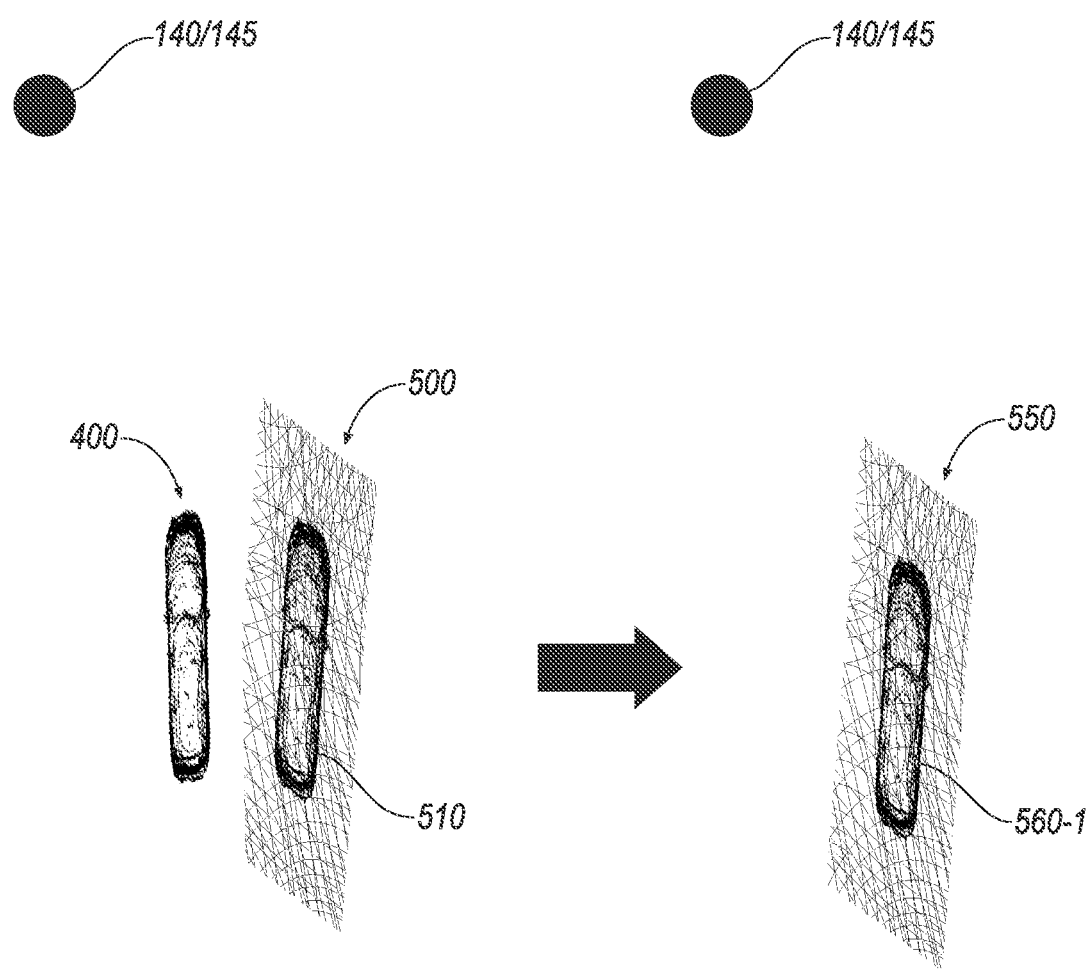
FIG. 5 schematically illustrates aligning data and determining a first pose of the exemplary moving object (the exemplary vehicle) as it moves in a coordinate system of a map of an area.
Figure 6:
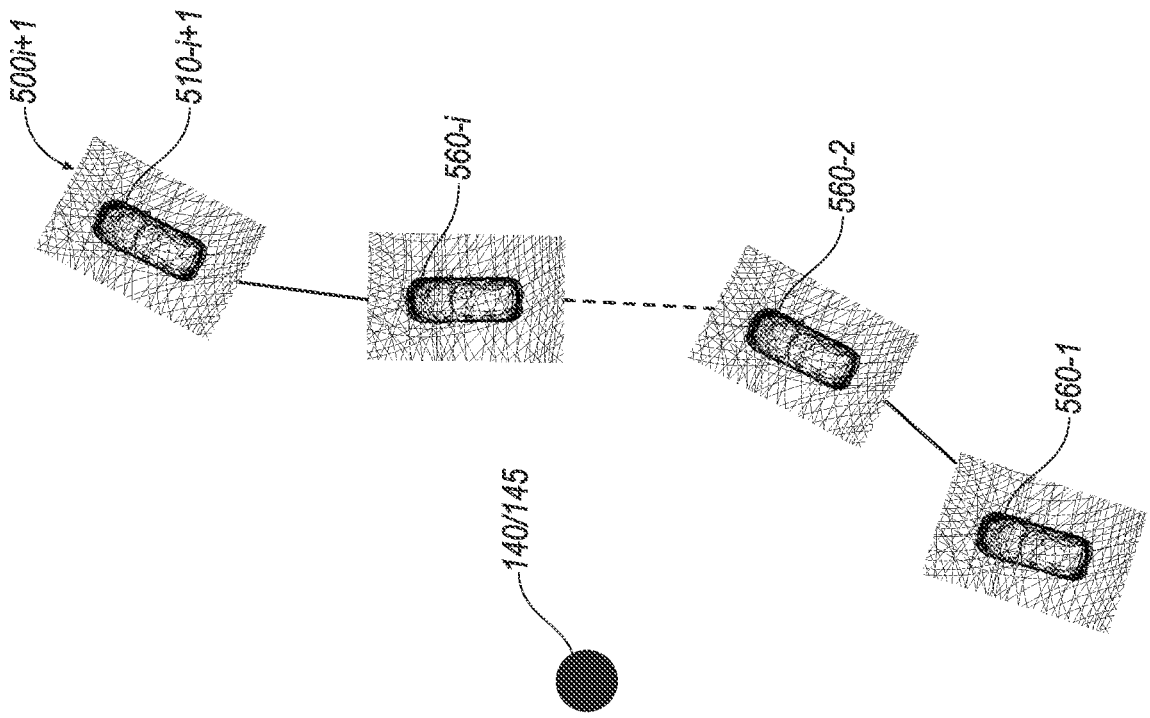
FIG. 6 schematically illustrates further aligning data in an iterative localization process for localizing the moving object (the exemplary vehicle) in the coordinate system of the map of the area.
Figure 6:
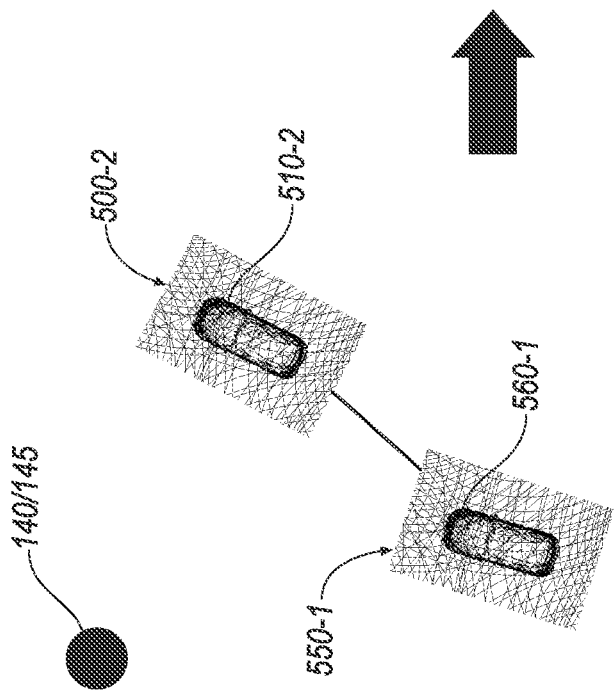

As an overview of the process 300, and with reference also to FIGS. 4-6, the process 300 accepts as input a reference model, e.g., in the format of point cloud data generated from a specification or model of an object, that includes a reference pose graph 400 (i.e., a reference pose) of the object. For example, the reference pose graph 400 could be determined based on a Computer Aided Design (CAD) model of the like of an object such as a vehicle. Then, as illustrated in FIG. 5, the reference pose graph 400 can be aligned with a pose graph 510 (i.e., including a pose of an object determined in real or near real time) determined to correspond to the object in a point cloud 500 or the like, i.e., data from a sensor 115, 145, resulting in an aligned data set 550 including an aligned pose graph 560 of the object. Aligning the reference pose graph 400 with the real-time or near real-time pose graph 510 can include a closest point algorithm or the like, whereby a conventional technique is used in which points in the reference pose graph 400 are identified corresponding to points in the pose graph 510 to determine an aligned first pose with respect to a coordinate system for an area 200. Further, as illustrated in FIG. 6, the alignment process can then be repeated in successive iterations for subsequent data collected at respective times in a succession or series of time.

Referring again to FIG. 3, the process 300 begins in a block 310 in which the computer 155 receives a set of point cloud data 500 at a first time and identifies in the first set of point cloud data an object to be localized, i.e., the object for which a pose (position and orientation) is to be determined. In this example, the object is a vehicle 105, and the computer 155 can, for example, obtain a camera image of a vehicle 105 and can identify the vehicle, e.g., using image recognition techniques, by make and model, or other identifiable features. For example, classifiers are known to be developed using machine learning techniques to interpret an image to identify and/or classify objects, e.g., according to a vehicle 105 make, model, etc.

Next, in a block 320, a reference model that represents the object is determined. The reference model is typically a 3D model such as obtained from CAD (Computer Aided Design) data or the like (any suitable 3D representation of a vehicle 05 body could be used) representing a class or type of object (e.g., a make, model, and model year of a vehicle 105) object, as mentioned above, and can be stored in the memory of computer 110, computer 155, and/or some other general-purpose computer.

Next, in a block 330, a reference pose graph 400 of the object in a coordinate system of a map of an area 200 is determined. That is, the reference model determined in the block 320 can be placed at a specified location and pose in a coordinate system for an area 200 to determine the reference pose graph 400. For example, FIG. 4 illustrates a reference pose graph 400 in a coordinate system of a map of area 200. That is, the reference pose graph 400 includes nodes or points specified in the reference pose graph 400 that collectively determine the reference pose of a vehicle 105 with respect to an area 200 coordinate system. Data points in a set of three-dimensional data such as the reference model described above can be identified as representing respective points on an object's surface and used in a pose graph 400 representing the object where each data point is a vertex/node and graph edges connect neighbor points to define points, lines, and surfaces of the object. Further, the pose graph 400 can have a location (or position) with respect to a coordinate system for an area 200 (e.g., points in the pose graph can have x, y, and z coordinates in the coordinate system), as well as an orientation (e.g., an object described by the pose graph 400 can have a pitch, yaw, and roll, i.e., respective X, Y, and Z axes of the object can have angles with X, Y, and Z axes of a coordinate system that define roll, pitch, and yaw). In other words, a "pose graph" is a collection of nodes (i.e., data points) that determine a pose of the object in the coordinate system.

Next, in a block 340, the computer 155 determines an $i^{th}$ aligned pose, e.g., in a first iteration (i.e., i=1) of the block 340, the computer 155 determines a first aligned pose of the object in the area 200 coordinate system by applying a closest point algorithm to align the reference pose graph 400 with a pose graph 510 of the object identified in the point cloud data 500-1. That is, FIG. 5 schematically illustrates the computer 155, aligning, i.e., transforming coordinates of, the reference pose graph 400 to a pose graph 510-1 included in point cloud 500-1 to determine the first aligned pose of a vehicle 105 with respect to the coordinate system for the map of the area 200. In subsequent iterations (see FIG. 6), (where i represents an $i^{th}$ iteration in 1 to n iterations, i.e., i is an integer counter specifying the current iteration) a pose graph 510-*i* in point cloud data 500-*i* is transformed to an aligned pose graph 560-*i*. Thus, herein the reference number 500 generically refers to a point cloud 500 obtained via a sensor 145, 115, the reference number 510 generically refers to a pose graph 510 determined in point cloud data 500, and the reference number 560 generically refers to a pose graph 560; a cardinal number appended to a reference to data 500, 510, 560 refers to an instance of the data in an iteration of the process 300, the data in a point cloud 500-*i* being obtained at an $i^{th}$ time in a series of 1 to n successive times. In short, in the block 340, the computer 155 aligns the reference pose graph 400 with the sensor data (e.g., point cloud data 500) collected at an $i^{th}$ time to determine the pose of the vehicle 105 at the $i^{th}$ time. As mentioned above, aligning the reference pose graph 400 with sensor data including a pose graph 510 may include executing a closest point algorithm (or using another suitable technique) that identifies nodes in the reference pose graph 400 that correspond to respective nodes in pose graph 510 to determine the first pose. In this way, data points of reference pose graph 400 are aligned with a corresponding data point of pose graph 510 to determine the first aligned pose (or simply "first pose").

Next, in a block 350, the computer 155 transmits or broadcasts the pose graph 560-*i*, e.g., using V2X protocols, for receipt by one or more vehicles 105. Because the pose graph 560-*i* localizes an object, e.g., vehicle 105, with high accuracy, typically to within a few centimeters, in the coordinate system for an area 200, a vehicle 105 can use the pose graph 560-*i* for operation, e.g., to make decisions about navigation such as steering, maintaining or changing a speed, etc.

Next, in a block 360 the computer 155 receives sensor data collected at a next (i+1) time after the $i^{th}$ time processed in the block 340, e.g., as the object continues to move with respect to the coordinate system and determines whether the object is detected in the data. That is, after a first set of data 500-1 is received in the block 310, successive sets of data 500-2, 500-3, . . . 500-*i*, . . . , 500-*n* (i.e., object data), may be received and an object such as a vehicle 105 may be detected in the data 500 while it is in an area 200. The first set of data 500-1 is referred to as "sensor data collected by a sensor at a first time". A successive second set of data 500-2 is referred to as "sensor data collected by a sensor at a second time". The additional successive sets of data 500-3, . . . 500-*i*, . . . , 500-*n* are each referred to as "additional sensor data". While point cloud data from a Lidar sensor (e.g., point cloud data 500) is illustrated, it is to be understood that sensor data can be received from LIDAR, radar, camera, ultrasonic sensors, etc. For example, sensor data from a camera sensor or sensors can be a stereo camera image. A vehicle 105 that has moved out of an area 200 will not be detected. If the object is not detected, then the process 300 ends. Otherwise, the process 300 returns to the block 340 for determining another $i^{th}$ aligned pose and subsequently to block 350 for transmitting the pose graph 560-*i* used to determine the respective pose of the object in the coordinate system. An "$i^{th}$ aligned pose" or simply "$i^{th}$ pose" refers to a first pose, a second pose, or one or more additional poses that can be determined in block 340.

As used herein, the term "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer comprising a processor and a memory, the memory storing instructions executable by the processor to:
   determine a reference pose of an object in a coordinate system of a map of an area based on a three-dimensional (3D) reference model representing the object;
   determine a first pose of the object at a first time at a first object location with respect to the coordinate system, the first pose determined based on the reference pose and sensor data collected by a sensor at the first time; and
   determine a second pose of the object at a second time that is after the first time at a second object location with respect to the coordinate system, the second pose determined based on the reference pose, the first pose, and sensor data collected by the sensor at the second time.

2. The system of claim 1, wherein the object is a vehicle, and the 3D reference model is determined based on identifying the vehicle.

3. The system of claim 1, wherein the memory further stores instructions to align the reference pose with the sensor data collected by the sensor at the first time to determine the first pose.

4. The system of claim 3, wherein the instructions to align the reference pose with the sensor data include instructions to execute a closest point algorithm.

5. The system of claim 3, wherein the memory stores further instructions to further align the sensor data collected by the sensor at the first time with the sensor data collected by the sensor at the second time to determine the second pose.

6. The system of claim 5, wherein the instructions to further align the sensor data collected by the sensor at the first time with the sensor data collected by the sensor at the second time include instructions to execute a closest point algorithm.

7. The system of claim 1, wherein the memory stores further instructions to: determine a third pose of the object at a third time that is after the second time at a third object location with respect to the coordinate system, the third pose determined based on the reference pose, the second pose, and sensor data collected by the sensor at the third time.

8. The system of claim 1, wherein the memory further stores instructions to transmit at least one of the first pose and the second pose to a vehicle.

9. The system of claim 8, further comprising the vehicle, including a vehicle computer that has a processor and a memory, the memory of the vehicle computer storing instructions executable by the processor of the vehicle computer to operate the vehicle based on at least one of the first pose and the second pose.

10. The system of claim 1, wherein the sensor is a lidar sensor and the sensor data is point cloud data.

11. A system, comprising:
    a stationary infrastructure element;
    a sensor mounted to the stationary infrastructure element; and
    a computer comprising a processor and a memory, the memory storing instructions executable by the processor to:

determine a reference pose of an object in a coordinate system of a map of an area based on a three-dimensional (3D) reference model representing the object;

determine a first pose of the object at a first time at a first object location with respect to the coordinate system, the first pose determined based on the reference pose and sensor data collected by the sensor at the first time; and determine a second pose of the object at a second time that is after the first time at a second object location with respect to the coordinate system, the second pose determined based on the reference pose, the first pose, and sensor data collected by the sensor at the second time.

12. The system of claim 11, wherein the object is a vehicle, and the 3D reference model is determined based on identifying the vehicle.

13. The system of claim 11, further comprising a vehicle including a vehicle computer that has a processor and a memory, the memory of the vehicle computer storing instructions executable by the processor of the vehicle computer to operate the vehicle based on at least one of the first pose and the second pose received from the stationary infrastructure element.

14. The system of claim 11, wherein the memory further stores instructions to align the reference pose with the sensor data collected by the sensor at the first time to determine the first pose.

15. The system of claim 11, wherein the memory stores further instructions to further align the sensor data collected by the sensor at the first time with the sensor data collected by the sensor at the second time to determine the second pose.

16. A method, comprising:

determining a reference pose of an object in a coordinate system of a map of an area based on a three-dimensional (3D) reference model representing the object;

determining a first pose of the object at a first time at a first object location with respect to the coordinate system, the first pose determined based on the reference pose and sensor data collected by a sensor at the first time; and determining a second pose of the object at a second time that is after the first time at a second object location with respect to the coordinate system, the second pose determined based on the reference pose, the first pose, and sensor data collected by the sensor at the second time.

17. The method of claim 16, further comprising aligning the reference pose with the sensor data collected by the sensor at the first time to determine the first pose.

18. The method of claim 17, further comprising aligning the sensor data collected by the sensor at the first time with the sensor data collected by the sensor at the second time to determine the second pose.

19. The method of claim 16, further comprising determining a third pose of the object at a third time that is after the second time at a third object location with respect to the coordinate system, the third pose determined based on the reference pose, the second pose, and sensor data collected by the sensor at the third time.

20. The method of claim 16, further comprising transmitting at least one of the first pose and the second pose to a vehicle, wherein the vehicle is then operated based on at least one of the first pose and the second pose.

* * * * *